March 15, 1949. W. T. GRAHAM 2,464,225
CLAMP
Filed July 1, 1946

WILLIAM T. GRAHAM
INVENTOR.

BY J. Vincent Martin
Ralph R. Browning
James B. Simms

ATTORNEYS

Patented Mar. 15, 1949

2,464,225

UNITED STATES PATENT OFFICE 2,464,225

CLAMP

William T. Graham, Amarillo, Tex.

Application July 1, 1946, Serial No. 680,613

6 Claims. (Cl. 248—228)

This invention relates to improvements in clamps and refers more particularly to clamps for securing the resilient shank of a ground tool holder to the support member of a plow frame or the like.

The clamp of this invention is an improvement on the clamp shown in the United States Patent 2,029,249 issued to Noell & Hoeme. The improved clamp is particularly adaptable for use in conjunction with plow frames or the like, made up of horizontal I-beams constituting support members. This type of frame is illustrated in the patent referred to above.

In the clamp of the patented apparatus all of the forces developed by engagement of the ground working tool are transmitted to the lower flanges of the support members through the resilient shank and clamp. In actual operation the flanges of the support members occasionally are distorted when excessive forces are encountered resulting in failure of the apparatus. Also in the patented apparatus the clamps must be assembled on the support members while the members are dismantled. In the event of failure of one of the clamps, the particular support member, with which the clamp was associated, must be dismantled from the frame and a new clamp inserted thereon.

An object of this invention is to provide a clamp for securing the shank of a ground tool holder to a support member of a plow frame or the like, wherein a part of the force transmitted to the support member by the shank is imparted to the upper portion of the member.

Another object is to provide a clamp for a ground tool holder which may be readily mounted on or removed from a support member.

A further object is to provide a clamp having a plurality of sections to facilitate its assembly, and having a brace for imparting a portion of the force encountered thereby to the upper portion of the support member.

Still another object is to provide a readily assembled sectional clamp having fastening means between the sections, adjustment of which simultaneously moves the flange engaging portion of the clamp into operable engagement with the support member flange and the brace portion into engagement with the supper portion of the support member.

Other and further objects will appear from the following description:

In the accompanying drawings which form a part of the instant specification and are to be read in conjunction therewith, and wherein like reference numerals are employed to designate like parts in the various views;

Fig. 1 is a sectional view of a clamp embodying this invention wherein the clamp is illustrated in operative position on the support member of a plow frame or the like;

Fig. 3 is a view similar to Fig. 1, showing a modified type of clamp; and

Figures 1, 3:
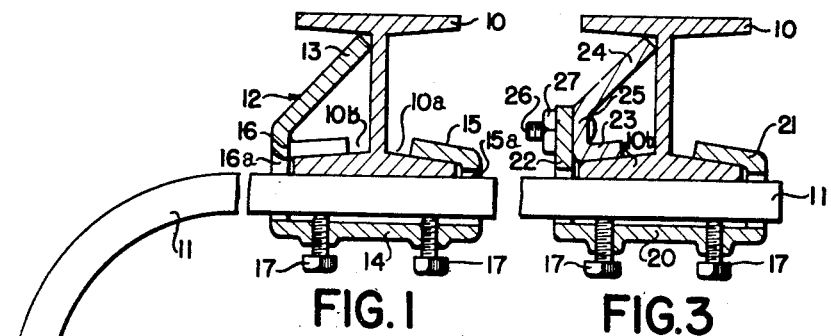

Referring to the drawings, the numeral 10 designates the support member of a plow frame. The support member is of the usual I-beam type. Secured to the I-beam is the resilient shank 11 of a ground tool holder.

The clamp 12 which secures the shank to the I-beam is characterized by a brace 13 engageable with the upper portion of the support member. The clamp has a lower web or body portion 14 which is substantially flat. Arms 15 and 16 are formed on opposite sides of the web portion and have inturned portions adapted to engage the upper surfaces of the lower flanges 10a and 10b of the support member. The arms also have upright portions with openings 15a and 16a therein. These openings are aligned and receive the end of resilient shank 11. The arm 16 is integral with brace 13.

The arrangement of the various portions of the clamp is such that when assembled on a support member with shank 11 inserted through openings 15a and 16a clearance is provided whereby the fit of the assembly is loose. This looseness permits ready adjustment of the assembly on the support member. Set screws 17, in web 14 of the clamp, provide a means for securing the clamp and shank in adjusted position on the support member.

It is believed that the operation of this invention is apparent from the foregoing description. The clamps, fabricated preferably from spring steel, are inserted on the end of the support members of the plow frame or the like. Usually a plurality of these clamps are used in conjunction with each of the I-beams 10 of the frame. The fit of the clamp on the I-beam is loose and permits a ready sliding movement along the beam. The inturned portions of arms 15 and 16 slide along the surface of the lower flanges 10a and 10b of the beam. When the clamps are arranged in approximate position along the beam shanks 11 are inserted through the openings 15a and 16a. Final adjustment of the position of the clamp on beam 10 is then made and set screws 17 are tightened to secure the assembly.

With the ground working device in operation an upward and rearward force is exerted upon shanks 11. This force imparts a torque to the clamp and the lower flanges of the beam 10. This torque is resisted by the inherent strength of the flanges of the I-beam in part and is partially resisted by the brace 13 in engagement with the juncture of the beam web and upper flange.

Figure 4:
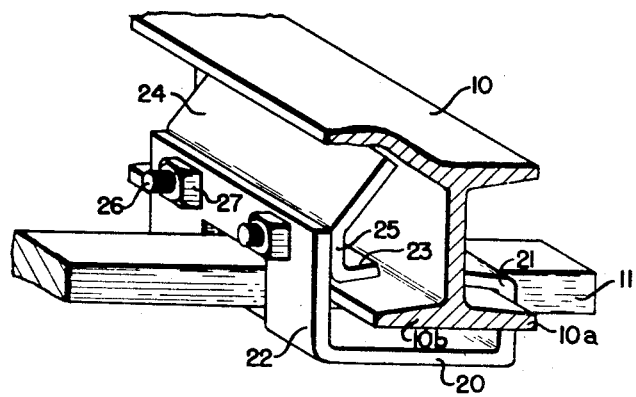
Fig. 4 is a perspective view of the assembly shown in Fig. 3.

In the modification illustrated in Figs. 3 and 4 the clamp is made up in sections. The shank holding section comprises the web 20, the upright and inturned arm 21 and an upright arm 22. Aligned openings are provided in arms 21 and 22 to receive the resilient shank 11. Set screws 17 threadedly engage web 20 and serve the same purpose as in the other modification.

The brace section comprises two flange portions 23 and 24 with an intermediate fastening portion 25. Flange portion 23 extends substantially at right angles from the fastening portion and when the clamp is assembled engages the upper surface of flange 10b of the I-beam. The flange 24 serves as a brace and is adapted to engage the upper portion of the support member, preferably at the juncture of the web and one of the upper flanges. Bolts 26 and nuts 27 fasten the brace section and shank holding section together. The arrangement is such that tightening the bolts and nuts abuts flange 23 against the surface of flange 10b of the beam and simultaneously the brace 24 is urged against the web of the beam. Again the set screws 17 may be used and facilitate this assembly.

Figure 2:
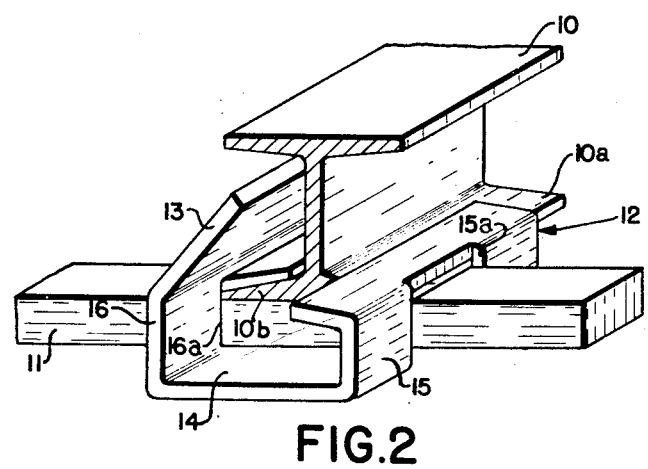
Fig. 2 is a perspective view of the apparatus illustrated in Fig. 1.

The advantage of this clamp over that shown in Figs. 1 and 2 is that it may be readily mounted on or removed from the support member of a plow frame because of its sectional construction.

It will be seen that the objects of this invention have been accomplished. The arrangement is such that the force imparted to the support member by the resilient shanks is distributed over a large area of the support member reducing the likelihood of distortion or failure thereof. The construction is such that the clamps may be readily and economically fabricated, and are of increased utility over the clamps heretofore used. There has also been provided a sectional type clamp which may be readily assembled or dismantled.

It will be understood that certain features and subcombinations are of utility and may be employed without reference to other features and subcombinations. This is contemplated by and is within the scope of the claims.

As many possible embodiments may be made of the invention without departing from the scope thereof it is to be understood that all matter herein set forth or shown in the accompanying drawings is to be interpreted as illustrative and not in a limiting sense.

Having described my invention, I claim:

1. A clamp of the type adaptable for use in securing the resilient shank of a ground tool holder to the support member of a plow frame or the like, where said support member has a vertical web portion with flanges extending substantially normally on each side of its lower edge, said clamp comprising a lower web portion with upstanding, inturned opposing arms for engaging the flanges of the support member, openings in the arms for receiving the shank, a brace extending upwardly and inwardly from one of the arms and adapted when in clamping relation with the support member to engage the upper portion thereof whereby part of the torque imparted to the clamp by the shank may be transmitted to the upper portion of the support member.

2. In an apparatus of the character described including a supporting member having a vertical web portion and upper and lower flange portions projecting laterally from the web portion, a shank of a ground working tool extending transversely of the lower flange and projecting substantially wholly from one side of said supporting member whereby action of the shank exerts torsional thrusts on said supporting member, clamp means having portions embracing said shank, means for securing the clamp means to the lower flange on the respective sides of said web portion, and a thrust distributing member having fixed support relatively to the lower flange and having a portion engaging the supporting member above the axial center of said member to distribute said thrust to both the lower and upper portion of said supporting member.

3. In an apparatus of the character described including a supporting member having a vertical web portion and upper and lower flange portions projecting laterally from the web portion, a shank of a ground working tool extending transversely of the lower flange and projecting substantially wholly from one side of said supporting member whereby action of the shank exerts torsional thrusts on said supporting member, a clamp having portions embracing said shank, inturned arms on the clamp for engaging upper faces of the lower flange on the respective sides of said web portion, fastening devices carried by the clamp to draw said arms into clamping contact with said faces, a thrust distributing member having fixed support relatively to the inturned arm on the projecting side of said shank and having a portion engaging the upper portion of the supporting member above its axial center to divide said thrust between the upper and lower portions of said supporting member.

4. A clamp adaptable for use in securing the shank of a ground tool to a support member of a plow frame I-shaped in cross section, said clamp comprising a body portion with shank receiving means and portions directly engageable with a flange of a support member and a brace mounted upon the body and engageable with a portion of the support member remote from the flange to which the clamp body is secured whereby in operation the forces from the shank are distributed over a greater area of the support member.

5. A clamp adaptable for use in securing the shank of a ground working tool to a support member of a plow frame which support member has a vertical web portion and upper and lower flange portions, said clamp including portions adapted to embrace said shank, means for securing the clamp to the lower flange on the respective sides of the web portion of the support member, and a thrust distributing member on the clamp having a portion adapted to engage the supporting member above the axial center of the web when the clamp is applied for distributing thrust of the shank to the upper portion of the supporting member.

6. A clamp adaptable for use in securing the resilient shank of a ground working tool to a support member which support member has a vertical web portion and upper and lower flange portions, said clamp including a body member provided with portions embracing the shank and an integral inturned arm for engaging an upper face on the lower flange on one side of the web portion of said supporting member, a detachable arm for engaging the upper face on the lower flange on the opposite side of the web portion, fastening means connecting the detachable arm with the body member of the clamp for drawing said detachable arm in contact with said face, a thrust distributing member projecting upwardly from one of the arms and having a terminal portion adapted to engage a portion of the supporting member above its axial center to divide thrust between the upper and lower portions of the supporting member when the clamp is applied to said supporting member.

WILLIAM T. GRAHAM.

REFERENCES CITED

The following references are of record in the file of this patent:

UNITED STATES PATENTS

| Number | Name | Date |
| --- | --- | --- |
| 728,919 | Horn | May 26, 1903 |
| 796,468 | Streeter | Aug. 8, 1905 |
| 854,209 | Goss | May 21, 1907 |
| 1,230,441 | Stevens | June 19, 1917 |
| 1,327,981 | Bruns | Jan. 13, 1920 |
| 1,801,015 | Luffman | Apr. 14, 1931 |
| 2,208,358 | Chandler | July 16, 1940 |

FOREIGN PATENTS

| Number | Country | Date |
| --- | --- | --- |
| 7,332 | Great Britain | 1906 |